(12) United States Patent
Hashimoto

(10) Patent No.: US 7,559,841 B2
(45) Date of Patent: Jul. 14, 2009

(54) POSE DETECTION METHOD, VIDEO GAME APPARATUS, POSE DETECTION PROGRAM, AND COMPUTER-READABLE MEDIUM CONTAINING COMPUTER PROGRAM

(75) Inventor: Yoshihisa Hashimoto, Tokyo (JP)

(73) Assignee: Sega Corporation, Tokyo (JP)

( * ) Notice: Subject to any disclaimer, the term of this patent is extended or adjusted under 35 U.S.C. 154(b) by 314 days.

(21) Appl. No.: 11/219,378

(22) Filed: Sep. 2, 2005

(65) Prior Publication Data

US 2006/0046847 A1 Mar. 2, 2006

(30) Foreign Application Priority Data

Sep. 2, 2004 (JP) ............... 2004-255948

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/36; 345/435; 345/473; 345/475; 382/173; 382/174

(58) Field of Classification Search ............... 273/454; 463/4, 36, 37; 382/106, 103
See application file for complete search history.

(56) References Cited

U.S. PATENT DOCUMENTS

| | | | |
|---|---|---|---|
| 5,616,078 A | | 4/1997 | Oh |
| 5,704,836 A * | | 1/1998 | Norton et al. ............... 463/36 |
| 6,130,677 A | | 10/2000 | Kunz ............... 345/630 |
| 6,283,860 B1 * | | 9/2001 | Lyons et al. ............... 463/36 |
| 6,417,841 B1 * | | 7/2002 | Doi et al. ............... 345/158 |
| 6,654,483 B1 * | | 11/2003 | Bradski ............... 382/107 |
| 7,071,914 B1 * | | 7/2006 | Marks ............... 345/156 |
| 7,162,082 B2 * | | 1/2007 | Edwards ............... 382/173 |
| 7,227,526 B2 * | | 6/2007 | Hildreth et al. ............... 345/156 |
| 2003/0113018 A1 * | | 6/2003 | Nefian et al. ............... 382/181 |
| 2004/0005924 A1 * | | 1/2004 | Watabe et al. ............... 463/36 |
| 2004/0063481 A1 * | | 4/2004 | Wang ............... 463/8 |
| 2005/0059489 A1 * | | 3/2005 | Kim ............... 463/36 |
| 2005/0271279 A1 * | | 12/2005 | Fujimura et al. ............... 382/203 |

(Continued)

FOREIGN PATENT DOCUMENTS

JP 07-185131 7/1995

(Continued)

OTHER PUBLICATIONS

Hämäläinen, P. (2002). QuiQui's Giant Bounce. Concept and Interaction Design of a Perceptually Interactive Computer Game for Children. Final thesis for Medialab in the University of Art and Design Helsinki, UIAH.*

*Primary Examiner*—John M. Hotaling, II
*Assistant Examiner*—Paul Anthony D'Agostino
(74) *Attorney, Agent, or Firm*—Baker Hostetler, LLP

(57) ABSTRACT

A technique is disclosed for detecting a pose of a player in a video game using an input image supplied by a camera. The technique involves calculating a frame difference and/or background difference of an image of a predetermined region of an image captured by the camera which captured image includes a player image representing the pose of the player, and generating operations information corresponding to the pose of the player based on the calculated frame difference and/or background difference.

8 Claims, 12 Drawing Sheets

U.S. PATENT DOCUMENTS

2006/0013440 A1* 1/2006 Cohen et al. .................. 382/103
2006/0202953 A1* 9/2006 Pryor et al. .................. 345/156

FOREIGN PATENT DOCUMENTS

| | | |
|---|---|---|
| JP | 07281666 | 10/1995 |
| JP | 11-053563 | 2/1999 |
| JP | 11-128534 | 5/1999 |
| JP | 11-128535 | 5/1999 |
| WO | WO 96/30856 | 10/1996 |
| WO | WO 02/19310 A1 | 3/2002 |

* cited by examiner

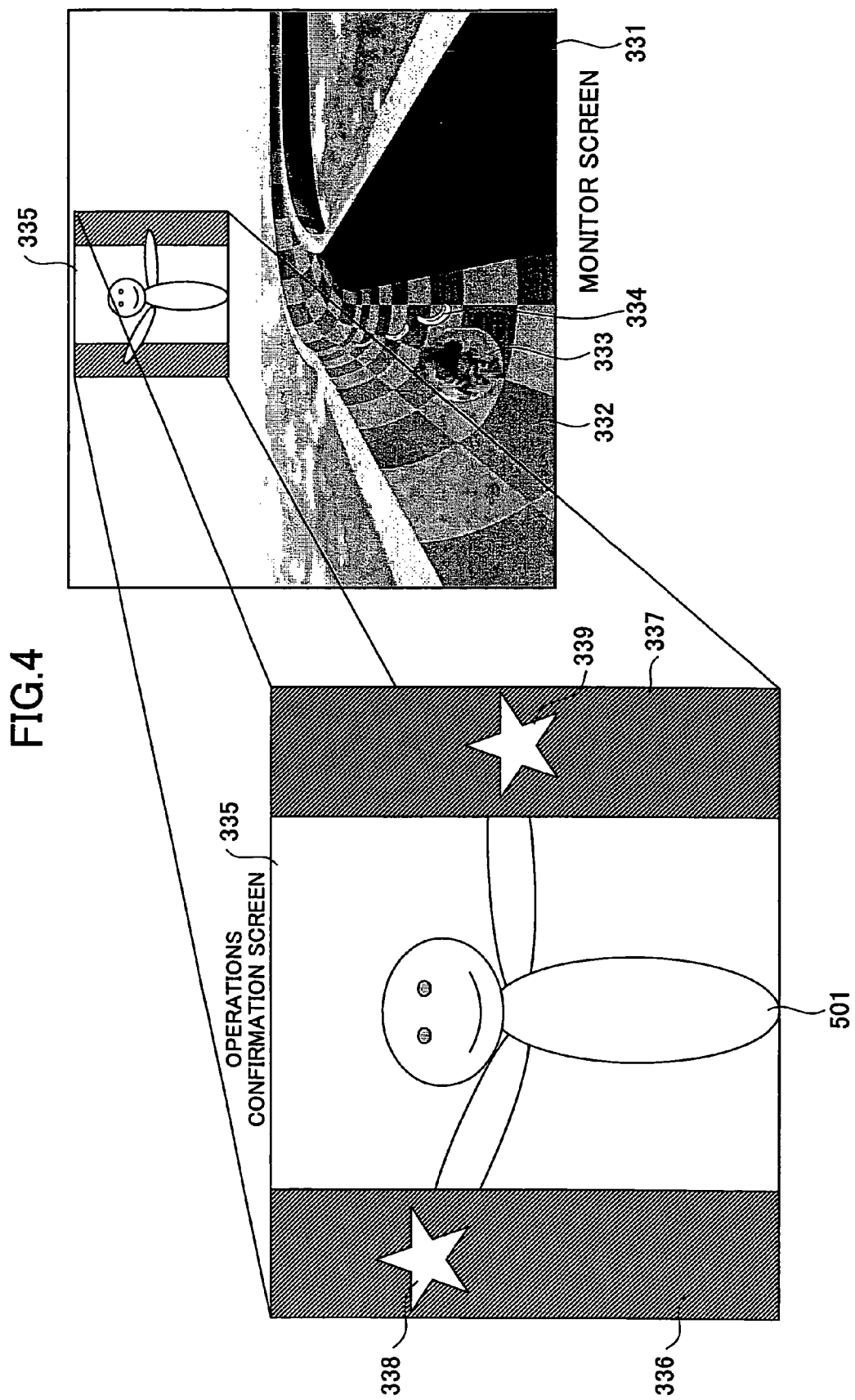

(SLOW DOWN)

(SLIGHTLY ACCELERATE)

(ACCELERATE)

(TURN RIGHT)

(TURN LEFT)

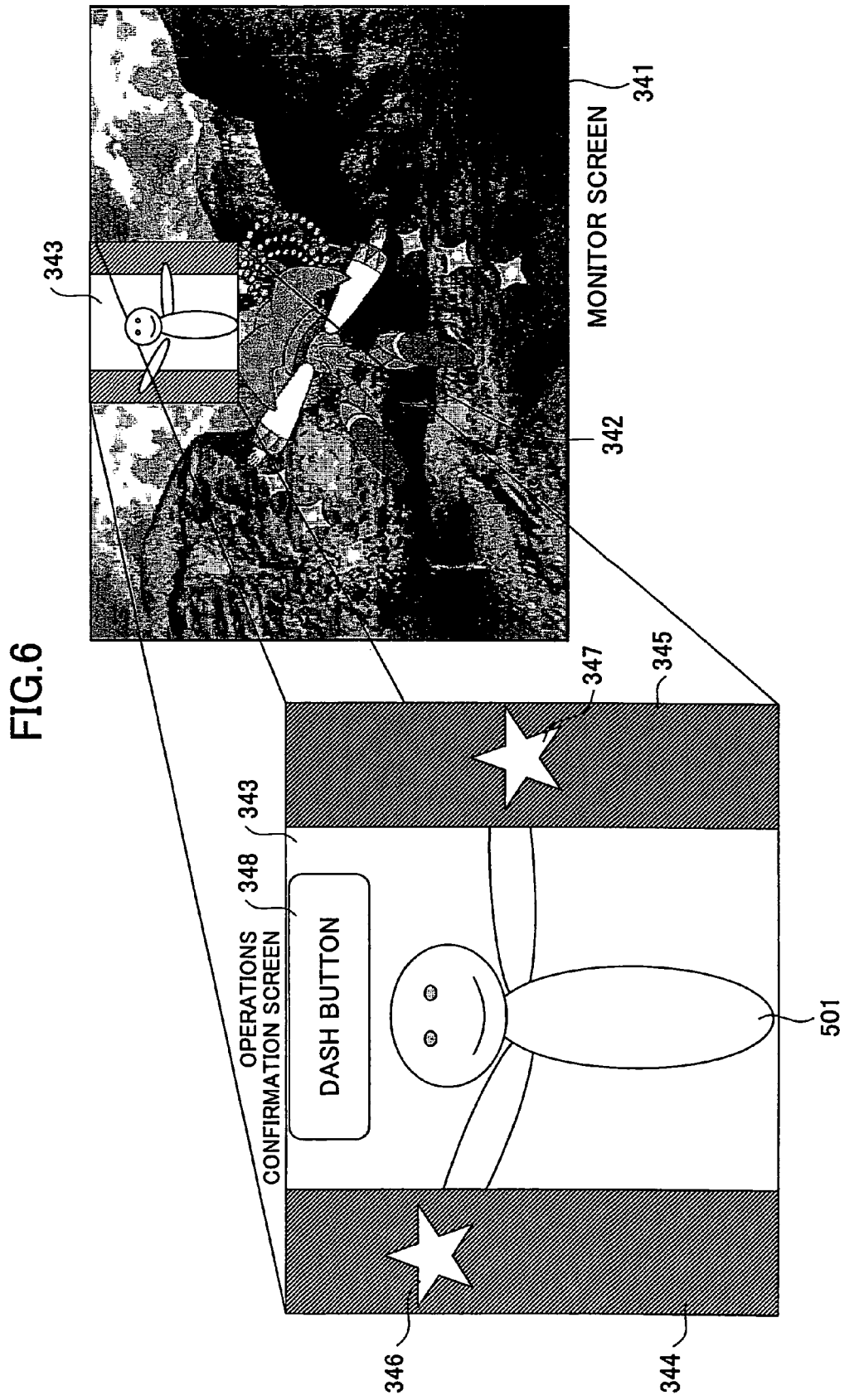

(ASCEND WHILE MOVING FORWARD)

(TURN RIGHT WHILE MOVING FORWARD)

(LEVEL OFF)

(TURN LEFT WHILE MOVING FORWARD)

(DESCEND WHILE MOVING FORWARD)

(ABRUPTLY ACCELERATE)

(TURN RIGHT IN HALT STATE)

(HALT)

(TURN LEFT IN HALT STATE)

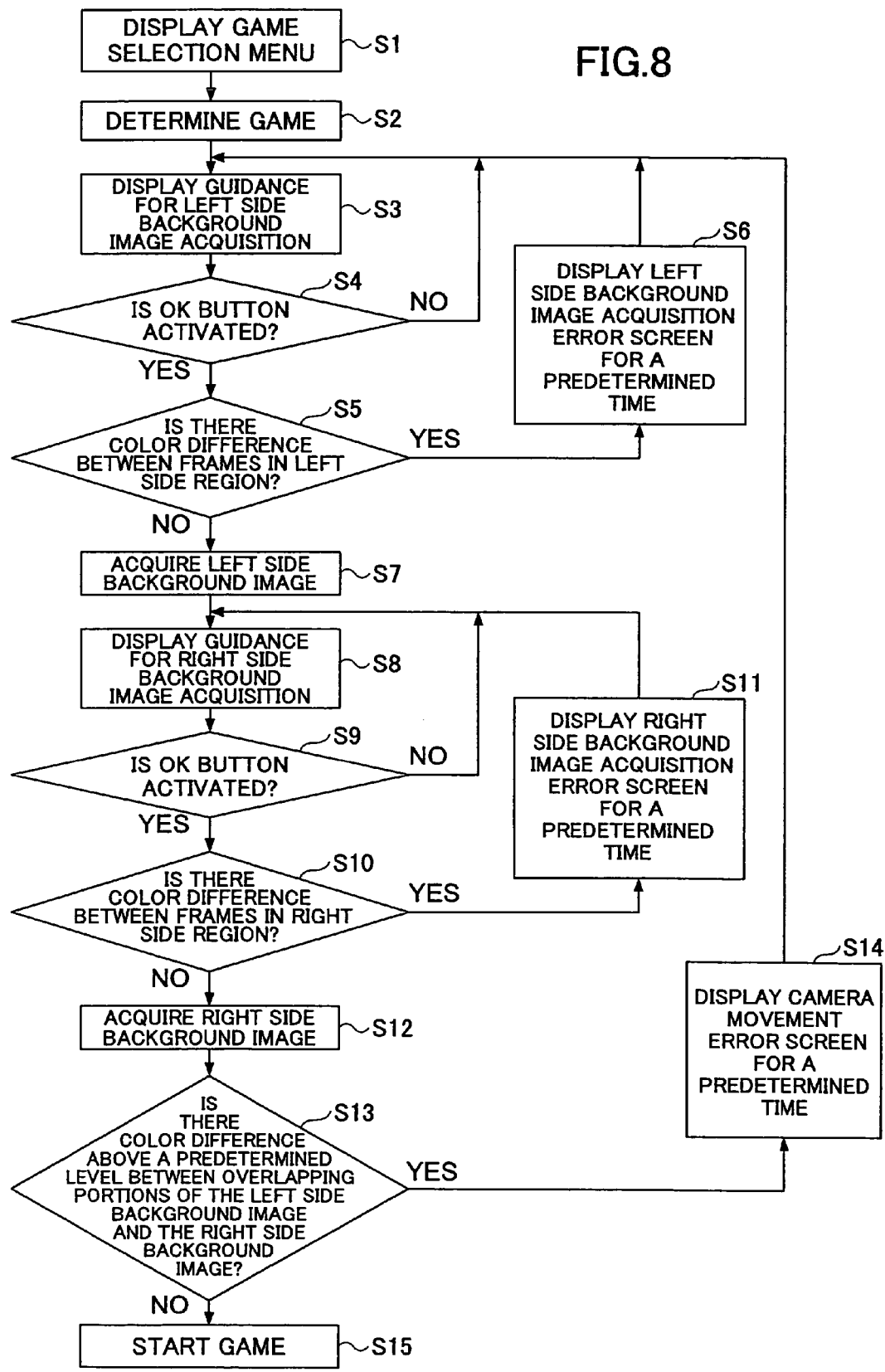

POSE DETECTION METHOD, VIDEO GAME APPARATUS, POSE DETECTION PROGRAM, AND COMPUTER-READABLE MEDIUM CONTAINING COMPUTER PROGRAM

BACKGROUND OF THE INVENTION

1. Field of the Invention

The present invention relates to a pose detection method, a video game apparatus, a pose detection program, and a computer-readable medium containing a computer program that are implemented for a video game using an input image supplied by a camera.

2. Description of the Related Art

In recent years and continuing, a video game using an input image supplied by a camera is becoming increasingly popular. In this type of video game, for example, an image of the posture of a player is captured by a camera and the captured image is composited with an image such as a button item. The composite image may be displayed on a monitor, and when the hand (arm) of the player is moved over the button item, the button item may respond to the movement and instigate an action, for example. In this case, a command input may be made solely based on the image captured by the camera, and a game controller (control pad operated by the hand) may not be necessary for controlling the playing of a game.

In the prior art, this type of video game relies on a technique involving acquisition of a so-called frame difference and recognizing movement within a portion when a change that is greater than a predetermined level is detected in this portion. The frame difference refers to the difference between an immediately preceding frame and the current frame (i.e., difference in pixel information between pixels of the frames, the pixel information corresponding to a color signal in RGB format, a brightness signal in YUV format, a signal representing the difference between a brightness signal and a red color signal, or a signal representing the difference between a brightness signal and a blue color signal, for example). Also, in the prior art, one or more images such as button items are arranged on a monitor screen for controlling the playing of a game and an image of a hand or some other movable part is arranged to be moved over the button items to realize game operations.

In the video game using an input image supplied by a camera as is described above, operations are realized based on detection of movement of an image of a hand over one or more button items, and thereby, the image of the player has to be displayed on the monitor screen. Consequently, a display screen such as a CG (Computer Graphics) screen representing features of the game may not be displayed on the entire monitor screen, and the game content may be degraded.

Also, in this case, operations are limited since an action may only be induced by activating the button item; that is, more detailed operations such as successively controlling the movement or position of a game character, for example, that may be realized by an analog stick type game controller (i.e., a game controller that is capable of outputting operations information including intermediate values by tilting a stick-type operations unit in up/down/left/right directions using fingers) may not be realized.

SUMMARY OF THE INVENTION

The present invention has been conceived in response to one or more of the problems of the related art, and its object is to provide a pose detection method, a game apparatus, a pose detection program, and a computer-readable medium containing a computer program for enabling operation through detection of a pose of a player in a video game that uses an input image supplied by a camera.

According to an aspect of the present invention, a pose detection method is provided that is implemented in a video game using an input image supplied by a camera for detecting the pose of a player, the method including the steps of:

calculating a frame difference and/or background difference of an image of a predetermined region of an image captured by the camera which captured image includes a player image representing the pose of the player; and generating operations information corresponding to the pose of the player based on the calculated frame difference and/or background difference.

In a preferred embodiment, the pose detection method of the present invention further includes the steps of:

calculating a left side frame difference and/or background difference of a left side image corresponding to a left side region within the captured image and a right side frame difference and/or background difference of a right side image corresponding to a right side region within the captured image;

calculating a left side center position of the left side frame difference and/or background difference and a right side center position of the right side frame difference and/or background difference;

calculating a positional difference between the left side center position and the right side center position with respect to up/down directions;

calculating an average position value of the left side center position and the right side center position with respect to the up/down directions; and converting a value based on the calculated positional difference and the calculated average position value into an analog stick signal.

In another preferred embodiment, the pose detection method of the present invention further includes the steps of:

calculating a left side background difference of the left side region and a right side background difference of the right side region;

calculating an additional region background difference of an additional region other than the left side region and the right side region within the captured image; and generating the operations information corresponding to the pose of the player based on whether the additional region background difference is substantial upon determining that the left side background difference and the right side background difference are insubstantial.

In another preferred embodiment of the present invention, the captured image is displayed within a portion of a monitor screen as an operations confirmation screen.

In another preferred embodiment, the pose detection method of the present invention further includes a step of:

displaying at least one marker indicating a position of a hand of the player that is recognized in at least one of the left side center position and the right side center position.

According to another aspect of the present invention, a video game apparatus is provided that is configured to execute a video game that uses an input image supplied by a camera, the apparatus including:

a frame difference/background difference calculating part for calculating a frame difference and/or background difference of an image of a predetermined region of an image captured by the camera which captured image includes a player image representing the pose of a player; and an operations information generating part for generating operations information corresponding to the pose of the player based on the calculated frame difference and/or background difference.

According to another aspect of the present invention, a computer-readable medium is provided that contains a pose detection program run on a computer for detecting the pose of a player in a video game using an input image supplied by a camera, the program being executed by the computer to realize the functions of:

calculating a frame difference and/or background difference of an image of a predetermined region of an image captured by the camera which captured image includes a player image representing the pose of the player; and generating operations information corresponding to the pose of the player based on the calculated frame difference and/or background difference.

According to another aspect of the present invention, a pose detection program run on a computer for detecting the pose of a player in a video game using an input image supplied by a camera is provided, the program being executed by the computer to realize the functions of:

calculating a frame difference and/or background difference of an image of a predetermined region of an image captured by the camera which captured image includes a player image representing the pose of the player; and generating operations information corresponding to the pose of the player based on the calculated frame difference and/or background difference.

BRIEF DESCRIPTION OF THE DRAWINGS

FIG. 4 is a diagram showing an exemplary screen that may be displayed on a monitor screen upon performing pose detection;

FIG. 6 is a diagram showing another exemplary screen that may be displayed on a monitor screen upon performing pose detection;

FIG. 8 is a flowchart showing the steps for performing a background image acquisition process according to an embodiment of the present invention;

DETAILED DESCRIPTION OF THE PREFERRED EMBODIMENTS

In the following, preferred embodiments of the present invention are described with reference to the accompanying drawings.

Figure 1:
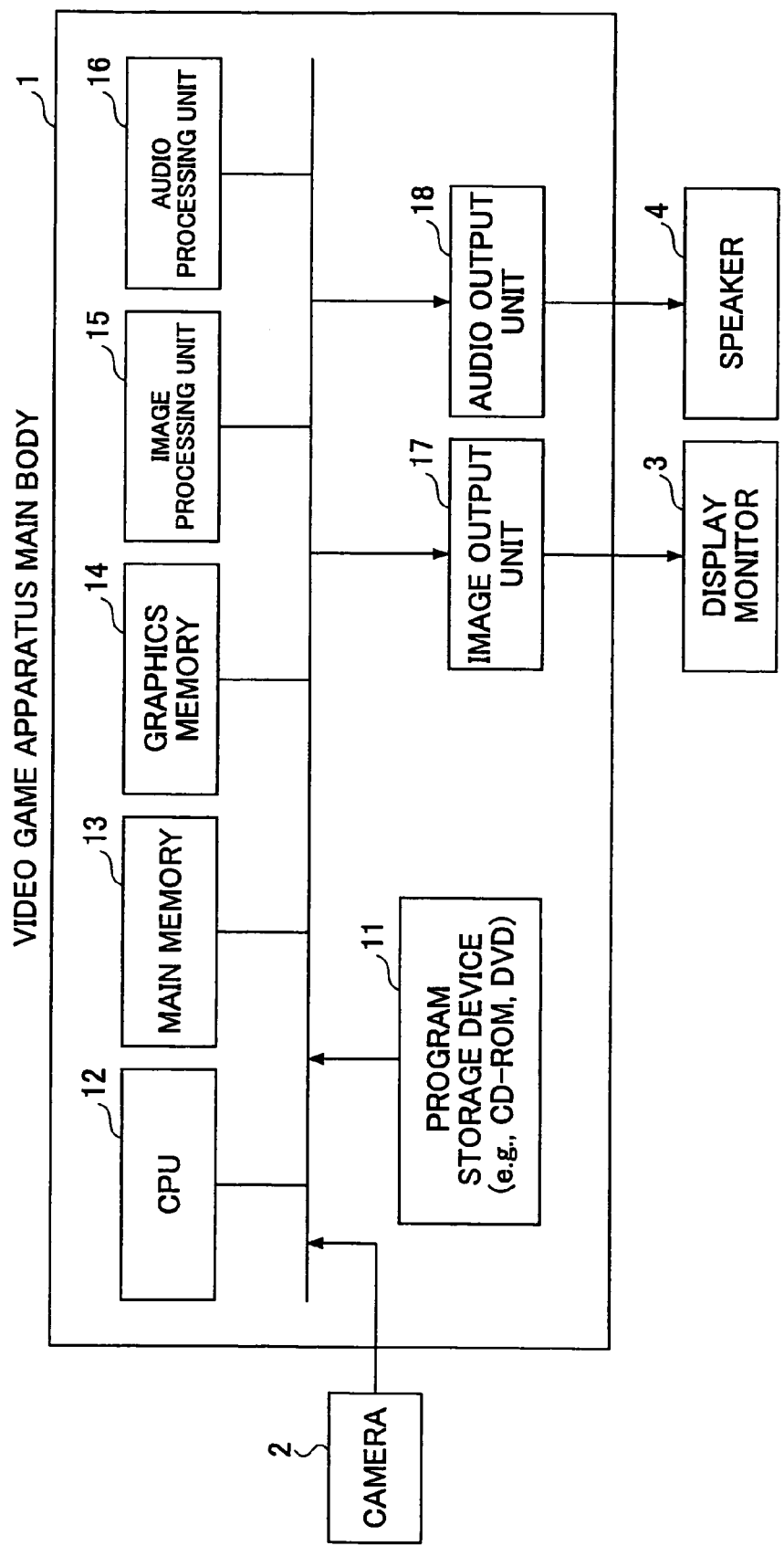
FIG. 1 is a block diagram showing a configuration of a game apparatus according to an embodiment of the present invention.

FIG. 1 is a block diagram showing a configuration of a video game apparatus according to an embodiment of the present invention.

The video game apparatus shown in FIG. 1 includes a video game apparatus main body 1 and a camera 2, a display monitor 3 such as a television monitor, and a speaker 4 that are connected to the video game apparatus 1 via a USB (Universal Serial Bus) cable, for example. It is noted that the camera 2 does not necessarily have to be directly connected to the video game apparatus main body 1, and may be connected thereto via a network, for example.

The video game apparatus main body 1 includes a program storage device 11 such as a CD-ROM or a DVD in which game software (program) is stored, a CPU 12 that executes overall control processes of the video game apparatus main body 1, a main memory 13 that temporarily stores programs and data used in executing control processes, a graphics memory (storage) 14 that stores image data, an image processing unit 15 that generates and controls an image according to game content, an audio processing unit 16 that generates and controls audio, an image output unit 17 that outputs an image signal to the display monitor 3, and an audio output unit 18 that outputs audio to the speaker 4.

Figure 2:
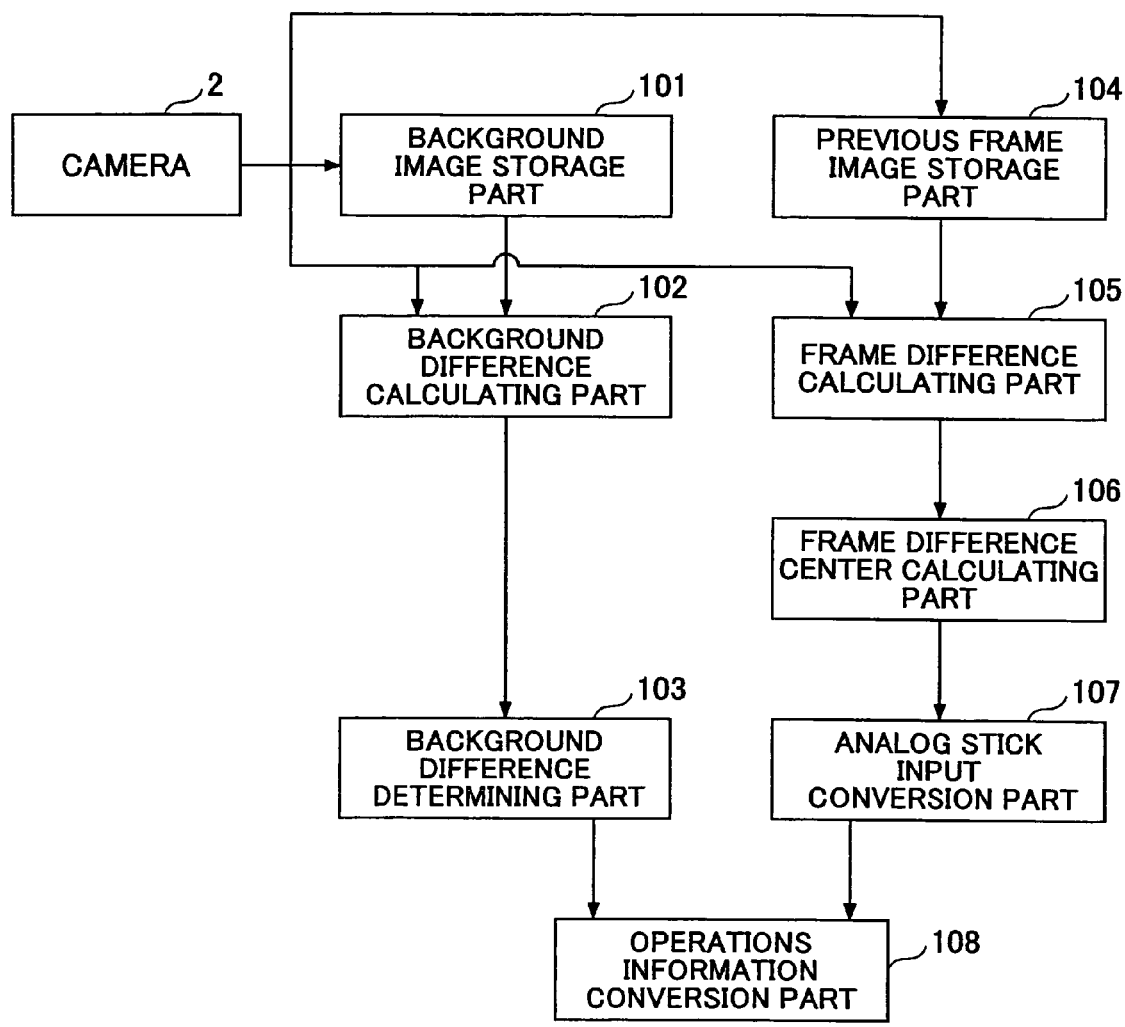
FIG. 2 is a block diagram showing a functional configuration for realizing pose detection.

FIG. 2 is a block diagram showing a functional configuration for realizing pose detection. According to the illustrated example, pose detection may rely on functional parts pertaining to background difference (difference in pixel information between pixels of a background image and a current image) including a background image storage part 101 for storing a background image acquired from the camera 2, a background difference calculating part 102 for calculating a difference (background difference) between a current image captured by the camera 2 and the background image stored by the background image storage part 101, and a background difference determining part 103 for determining whether there is a background difference in a predetermined region.

Also, pose detection according to the present example may rely on functional parts pertaining to frame difference (difference in pixel information between pixels of a previous frame and a current frame) including a previous frame image storage part 104 for storing a previous frame image captured by the camera 2, a frame difference calculating part 105 for calculating a difference (frame difference) between a current image captured by the camera 2 and the previous frame image stored by the previous frame image storage part 104, a frame difference center calculating part 106 for calculating a frame difference center position within a predetermined region, and an analog stick input conversion part 107 for converting an input command into a signal corresponding to an analog stick signal from a game controller based on the center position of the frame difference calculated by the frame difference center calculating part 106.

Further, pose detection according to the present example may rely on a functional part for integrating the background difference detection result and the frame difference detection result which functional part is embodied by an operations information conversion part 108 for generating operations information for a game character based on the determination result of the background difference determining part 103 and the analog stick signal from the analog stick input conversion part 107.

Figure 3:
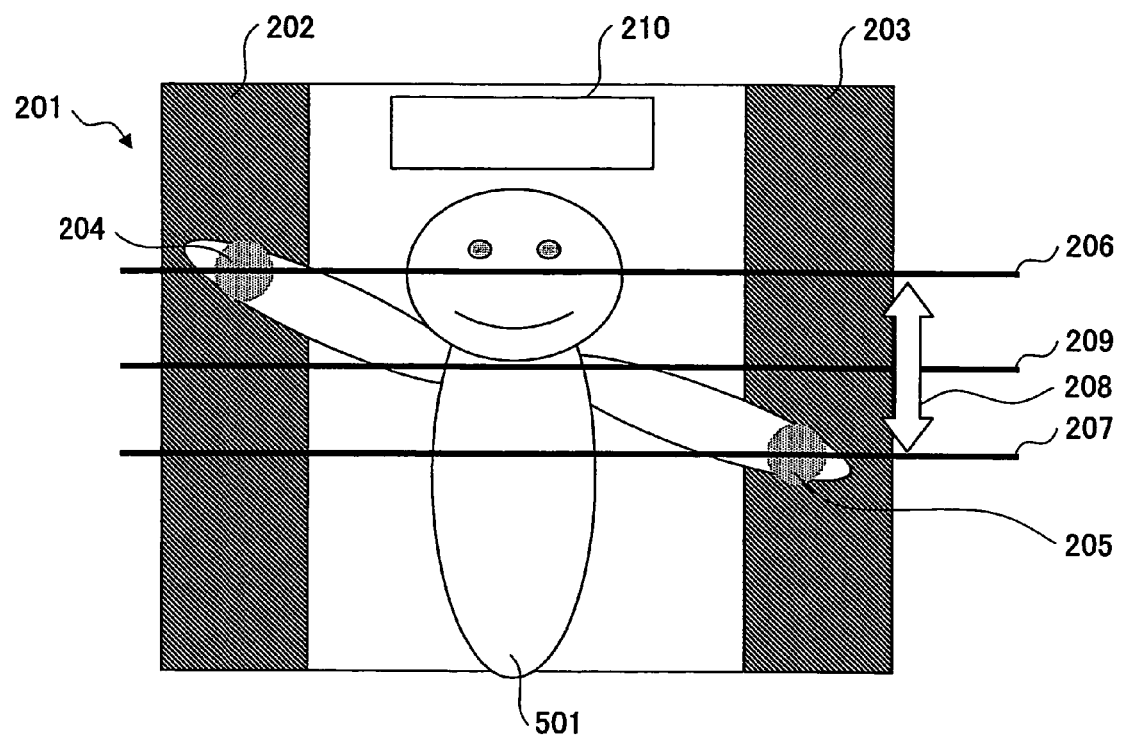
FIG. 3 is a diagram illustrating an exemplary image processing operation for realizing pose detection.

FIG. 3 is a diagram illustrating an exemplary image processing operation for realizing pose detection using the functional parts shown in FIG. 2.

In the illustrated example of FIG. 3, the frame difference calculating part 105 calculates the frame difference for a captured image 201 captured by the camera 2, and the frame difference center calculating part 106 calculates frame difference centers 204 and 205 corresponding to the positions of the hands (arms) of the player 501 detected within regions 202 and 203 corresponding to left and right side regions, respectively, with predetermined widths.

Specifically, center-positions 206 and 207 representing height positions (i.e., positions with respect to up/down directions) of the frame difference centers 204 and 205 of the regions 202 and 203 are calculated, respectively, and a height difference (positional difference) 208 between the left and right side center positions 206 and 207 and an average value (average position value) 209 of the calculated left and right side center positions 206 and 207 with respect to up/down directions are calculated.

The analog stick input conversion part 107 outputs a value obtained by multiplying the difference 208 between the centers 206 and 207 by a predetermined coefficient as a left/right direction signal of an analog stick signal, and outputs a value obtained by multiplying the average value 209 of the centers 206 and 207 by a predetermined coefficient as an up/down direction signal of the analog stick signal.

Also, the background difference calculating part 102 calculates the background difference for the captured image 201. The background difference determining part 103 determines whether there are background differences in the left and right side regions 202 and 203 as well as a region 210. It is noted that in a case where pose detection is limited to detecting poses based on the positions of centers 204 and 205 for the left and right hands of the player 501 (e.g., spreading arms (hands) in left-right directions and simultaneously raising/lowering arms, or alternatingly raising/lowering left and right arms), the determination of whether a background difference is detected in the region 210 may be unnecessary. However, when the pose detection is arranged to detect a pose with both hands (arms) directed downward to signal a "HALT" command, or a pose with both hands directed upward to signal an "ABRUPTLY ACCELERATE" command, for example, the pose detection relies on the existence of background differences in the regions 202 and 203 as well as the region 210 (it is noted that a detection region for detecting the existence of hands in a lower side region is not provided since such positioning of the hands of the player 501 is difficult to detect owing to the fact that the image of the hands may not be easily distinguished from the image of the body). Specifically, when the left and right hands of the player 501 are directed upward or downward, the centers 204 and 205 for the left and right hands of the player 501 may not be detected in which case no background differences would be detected in the regions 202 and 203. In this case, when no background difference is detected in the region 210, it may be determined that the hands of the player 501 are directed downward. Also, when no background differences are detected in the regions 202 and 203, and a background difference is detected in the region 210, it may be determined that the hands of the player 501 are directed upward.

In the above described example, the centers 204 and 205 of the hands of the player 501 are detected based on background difference; however, in another example, the detection may be realized based on frame difference. In such an example, a frame difference may not be detected when there is no movement in the hands of the player 501, and a previous detection state is maintained in such a case. The detection based on background difference has an advantage in that a pose may be detected even when there is no movement in the hands of the player 501. Also, it is noted that frame difference may be used in place of background difference in the detection region 210 as well; however, background difference is preferably used in order to realize more accurate image recognition.

FIG. 4 is a diagram showing an exemplary screen that may be displayed on a monitor screen upon performing pose detection. In FIG. 4, a game screen is displayed on the monitor screen 331 of the display monitor 3 (see FIG. 1), and an operations confirmation screen 335 for realizing pose detection is displayed at a portion of the monitor screen 331. In the illustrated game screen, a boat 333 that is driven by a game character (e.g., monkey) is maneuvered along a winding course 332 to catch items (e.g., bananas 334) provided along the course 332.

As is shown in the enlarged operations confirmation screen 335 of FIG. 4, in regions 336 and 337 for detecting the positions of the hands (arms) of the player 501, the detected positions of the hands are arranged to be indicated by markers 338 and 339.

Figure 5A:
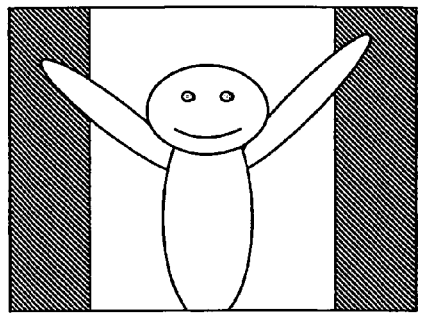
FIGS. 5A through 5E are diagrams illustrating poses that may be detected in pose detection according to one example.
Figure 5B:
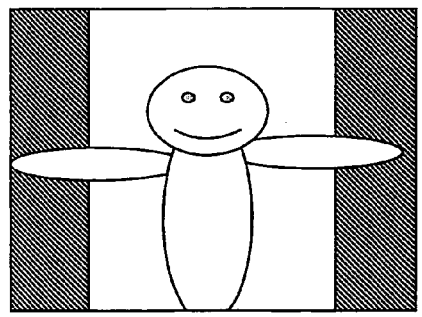
Figure 5C:
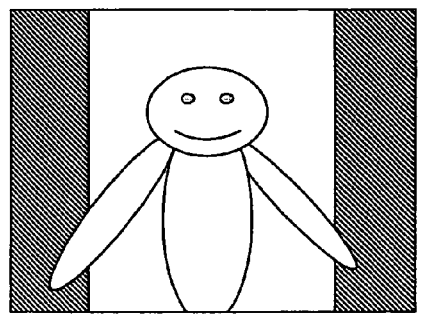
Figure 5D:
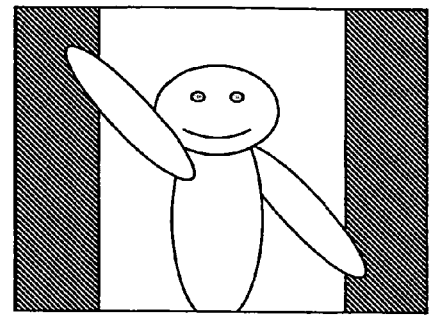
Figure 5E:
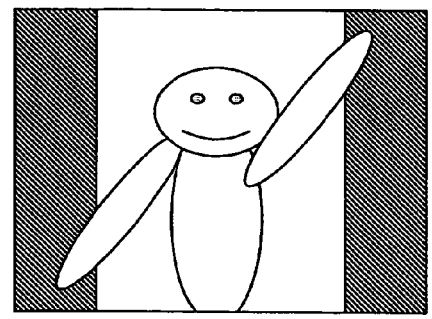

FIGS. 5A through 5E are diagrams illustrating exemplary poses that may be detected in pose detection for the game shown in FIG. 4. FIG. 5A shows a pose with both hands spread out and raised that represents a "SLOW DOWN" command; FIG. 5B shows a pose with both hands spread out in horizontal directions that represents a "SLIGHTLY ACCELERATE" command; FIG. 5C shows a pose with both hands spread out and lowered that represents an "ACCELERATE" command; FIG. 5D shows a pose with the left hand being raised and the right hand being lowered that represents a "TURN RIGHT" command; and FIG. 5E shows a pose with the right hand being raised and the left hand being lowered that represents a "TURN LEFT" command. It is noted that in the present example, the intermediate (transitional) states of the poses are also detected, and operations information is generated in an analog fashion.

FIG. 6 is a diagram showing another exemplary screen that may be displayed on a monitor screen upon performing pose detection. In FIG. 6, a game screen is displayed on the monitor screen 341 of the display monitor 3, and an operations confirmation screen 343 for realizing pose detection is displayed at a portion of the monitor screen 341. In the illustrated game screen, a game character 342 is arranged to fly in the displayed region.

As is shown in the enlarged operations confirmation screen of FIG. 6, in regions 344 and 345 for detecting the positions of the hands (arms) of the player 501, the detected positions of the hands are indicated by markers 346 and 347. Also, in the illustrated operations confirmation screen, a dash button 348 for abruptly increasing the flying speed is displayed at an upper region. It is noted that this dash button 348 is an example of the region 210 shown in FIG. 3.

Figure 7A:
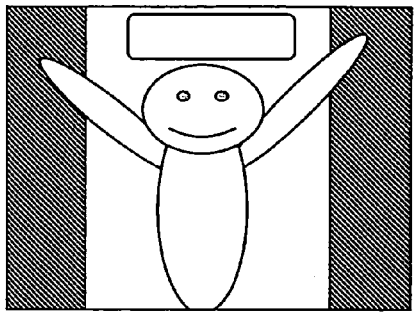
FIGS. 7A through 7I are diagrams illustrating poses that may be detected in pose detection according to another example.
Figure 7D:
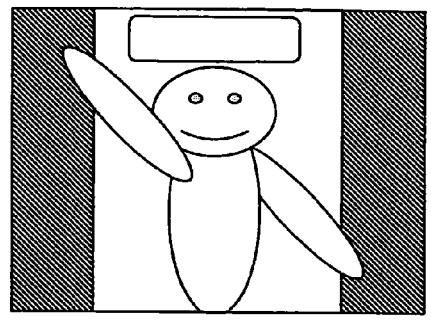
Figure 7B:
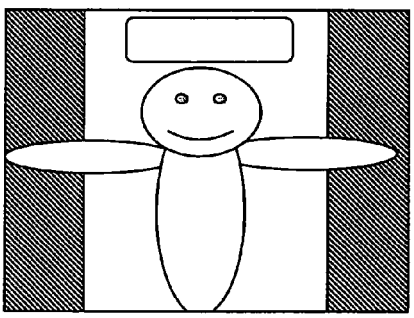
Figure 7E:
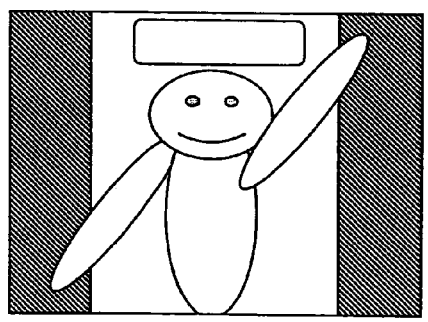
Figure 7C:
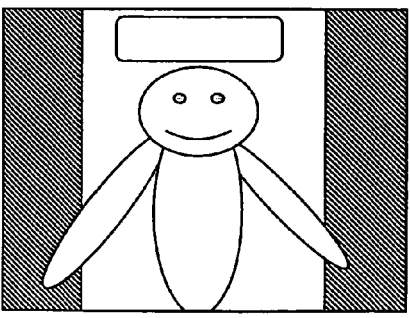
Figure 7F:
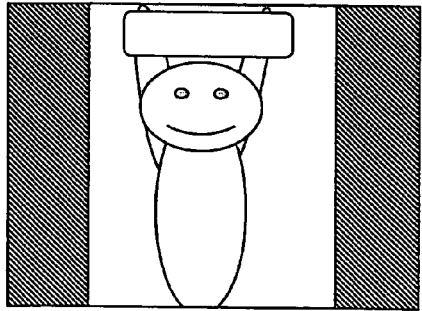
Figure 7G:
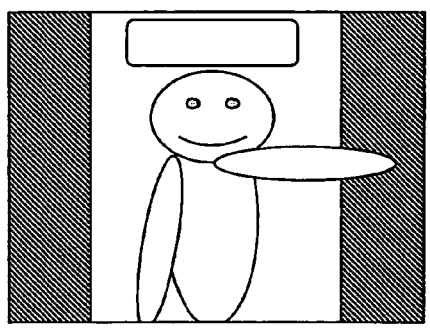
Figure 7:
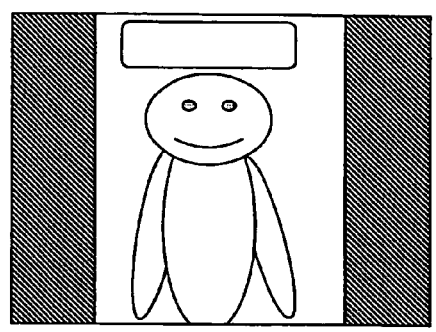
Figure 7H:
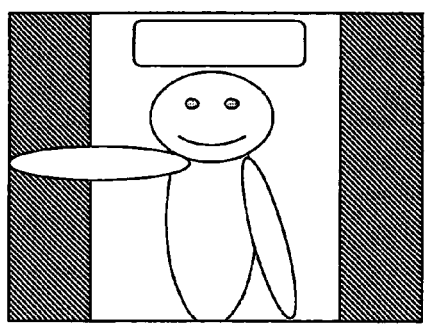

FIGS. 7A through 7I are diagrams illustrating exemplary poses that may be detected in pose detection for the game shown in FIG. 6. FIG. 7A shows a pose with both hands spread out and raised that represents an "ASCEND WHILE MOVING FORWARD" command; FIG. 7B shows a pose with both hands spread out in horizontal directions that represents a "LEVEL OFF" command; FIG. 7C shows a pose with both hands spread out and lowered that represents a "DESCEND WHILE MOVING FORWARD" command; FIG. 7D shows a pose with the left hand being raised and the right hand being lowered that represents a "TURN RIGHT WHILE MOVING FORWARD" command; FIG. 7E shows a pose with the right hand being raised and the left hand being lowered that represents a "TURN LEFT WHILE MOVING FORWARD" command; FIG. 7F shows a pose with both hands raised that represents an "ABRUPTLY ACCELERATE" command; FIG. 7G shows a pose with the left hand being directed downward and the right hand being directed horizontally that represents a "TURN RIGHT IN HALT STATE" command; FIG. 7H shows a pose with the right hand being directed downward and the left hand being directed horizontally that represents a "TURN LEFT IN HALT STATE" command; and FIG. 7I shows a pose with a "HALT" command. It is noted that in the present example, intermediate (transitional) states of the poses are also detected, and operations information is generated in an analog fashion.

According to an aspect of the present invention, in detecting a pose of a player based on an image captured by a camera in a camera video game, a frame difference and/or a background difference is calculated with respect to an image of a predetermined region of a captured image including an image of the posture of a player captured by the camera, and operations information corresponding to the pose of the player is generated based on the calculated frame difference and/or background difference. In this way, detailed operations may be realized that are similar to those realized by an analog stick of a game controller as opposed to merely activating a button item to realize an operation as in the prior art. Also, the captured image does not have to be displayed with an image such as a button item for realizing an operation on a large part of the monitor screen, and an operations confirmation screen may be displayed on a small portion of the monitor screen so that a substantial part of the monitor screen may be use to display a screen such as a CG screen representing actual game contents.

In the following, background image acquisition that is required for calculating a background difference is described.

FIG. 8 is a flowchart illustrating steps of a background image acquisition process for acquiring a background image that is required for calculating a background difference in the video game apparatus shown in FIG. 1. It is noted that the illustrated background image acquisition process may be executed by the CPU 12 of the video game apparatus main body 1 using relevant programs.

In the illustrated example of FIG. 8, when a game is started, a game selection menu is displayed on the display monitor 3 shown in FIG. 1 (step S1), and a game to be played is determined according to a selection made by a player (step S2). It is noted that in the present example, it is assumed that plural mini games are included in one set of game software; however, in a case where the game software includes only one game, steps S1 and S2 may be omitted.

Figure 9:
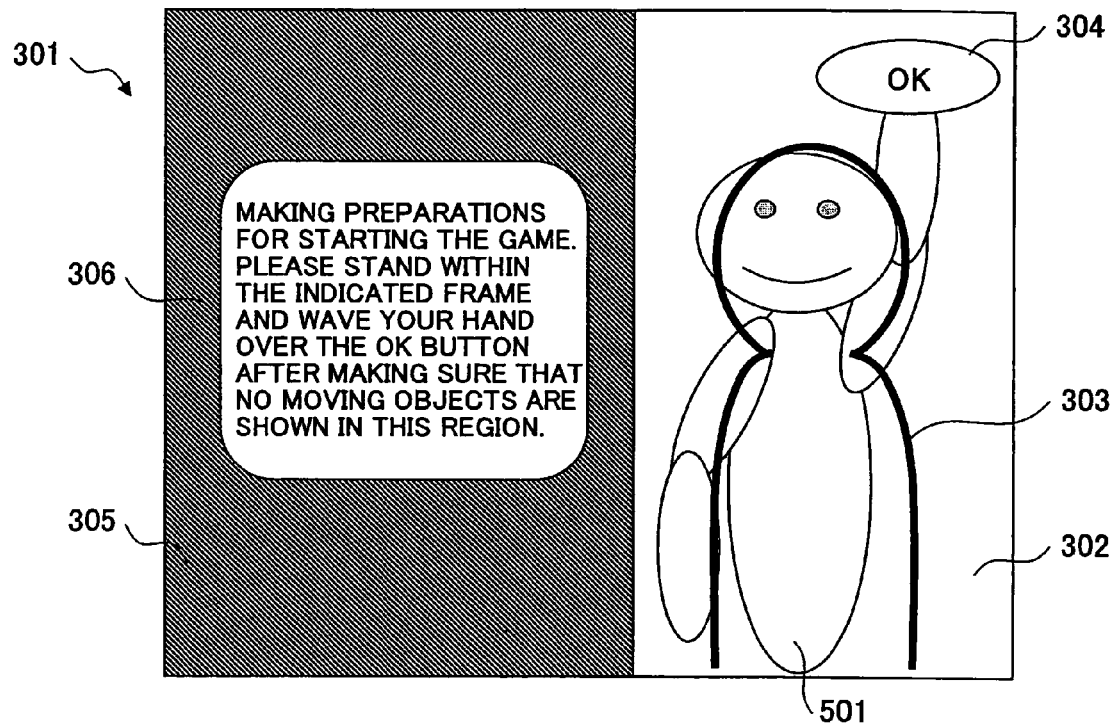
FIG. 9 is a diagram showing an exemplary screen that may be displayed upon performing a left side background image acquisition process.

Then, guidance for acquiring a left side background image is displayed on the display monitor 3 (step S3). FIG. 9 is a diagram showing an exemplary screen that may be displayed upon performing a left side background image acquisition process. In FIG. 9, a frame 303 indicating a standing position outline for a player 501 and a button item 304 that is to be operated by the player 501 are displayed at a right side operation region 302 on the right side of a monitor screen 301, and a message 306 indicating, "MAKING PREPARATIONS FOR STARTING THE GAME. PLEASE STAND WITHIN THE INDICATED FRAME AND WAVE YOUR HAND OVER THE OK BUTTON AFTER MAKING SURE THAT NO MOVING OBJECTS ARE SHOWN IN THIS REGION:" is displayed at a left side background acquisition region 305 on the left side of the monitor screen 301. It is noted that the left side background acquisition region 305 is arranged to be slightly larger than half the monitor screen 301 so that an overlapping portion with a right side background acquisition region 311 (see FIG. 11) may be provided as is described below. In this way, influence from noise generated at the dividing portion between the left and right background acquisition regions 305 and 311 may be reduced, and a determination may be made as to whether the camera has been moved during acquisition of the background image based on the image difference between the overlapping portions of the left and right background acquisition regions 305 and 311.

Referring back to FIG. 8, a determination is made as to whether the OK button is activated (step S4). If the OK button is not activated, the guidance for left side background image acquisition continues to be displayed (step S3). If the OK button is activated, a determination is made as to whether there is any moving object included in the left side background acquisition region 305 based on the frame difference (i.e., difference in pixel information between pixels of frames) detected within the region 305 (step S5). It is noted that if a moving object is included in a background acquisition region, its corresponding image cannot be used as a background image for calculating the background difference; therefore, the existence of a moving object is checked for before acquisition of the background image in order to improve efficiency.

Figure 10:
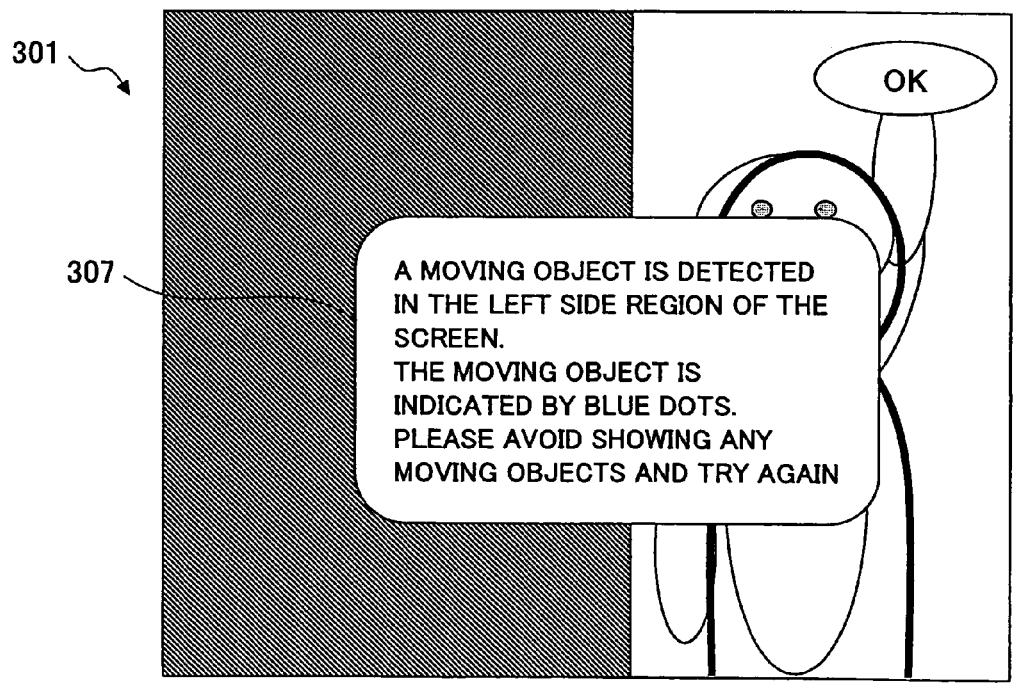
FIG. 10 is a diagram showing an exemplary error screen that may be displayed when the left side background image acquisition process fails.

When it is determined in step S5 that a moving object exists, an error screen is displayed on the monitor careen 301 for a predetermined period of time (step S6). FIG. 10 is a diagram showing an exemplary error screen that may be displayed when the left side background image acquisition process fails. In FIG. 10, a message indicating, "A MOVING OBJECT IS DETECTED IN THE LEFT SIDE REGION OF THE SCREEN. THE MOVING OBJECT IS INDICATED BY BLUE DOTS. PLEASE AVOID SHOWING ANY MOVING OBJECTS AND TRY AGAIN." is displayed on the monitor screen 301.

Referring back to FIG. 8, when it is determined in step S5 that a moving object is not included in the left side background acquisition region 305, the image of the background acquisition region 305 is acquired as a background image (step S7).

Figure 11:
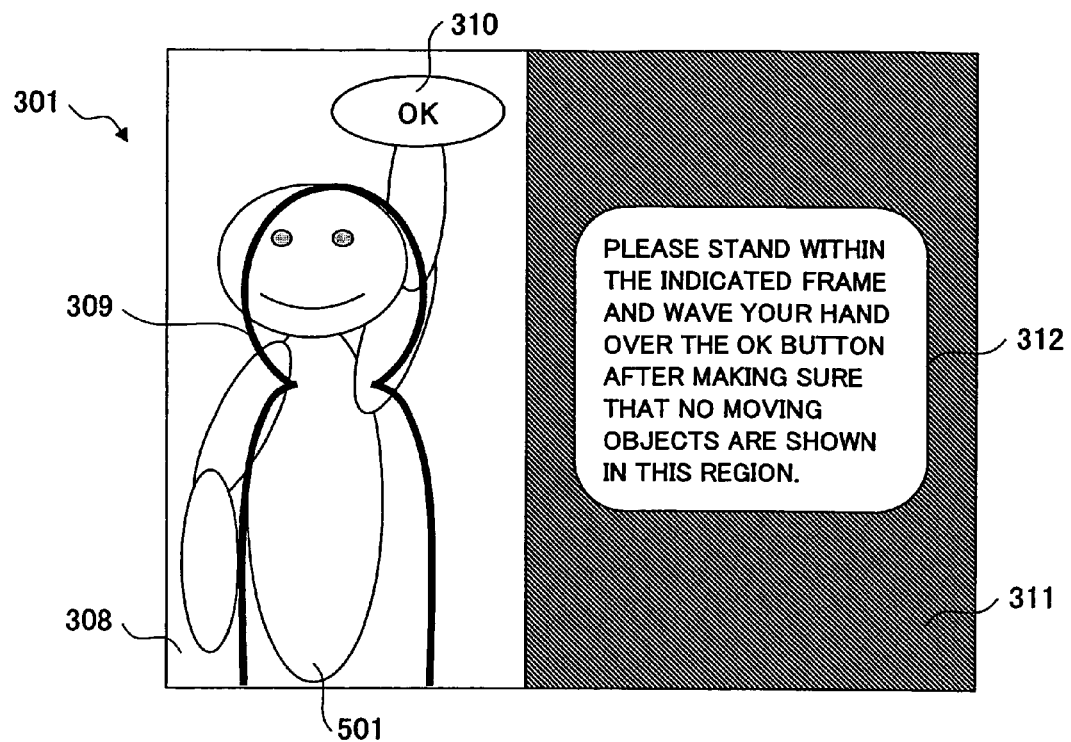
FIG. 11 is a diagram showing an exemplary screen that may be displayed upon performing a right side background image acquisition process.

Then, guidance for acquiring a right side background image is displayed on the display monitor 3 (step S8). FIG. 11 is a diagram showing an exemplary screen that may be displayed upon performing a right side background image acquisition process. In FIG. 11, a frame 309 indicating a standing position outline for the player 501 and a button item 310 to be operated by the player 501 are displayed at a left side operation region on the left side of the monitor screen 301, and a message 312 indicating, "PLEASE STAND WITHIN THE INDICATED FRAME AND WAVE YOUR HAND OVER THE OK BUTTON AFTER MAKING SURE THAT NO MOVING OBJECTS ARE SHOWN IN THIS REGION." is displayed at a right side background acquisition region 311 on the right side of the monitor screen 301.

Then, referring back to FIG. 8, a determination is made as to whether the OK button is activated (step S9). If the OK button is not activated, the guidance for right side background image acquisition continues to be displayed (step S8). If the OK button is activated, a determination is made as to whether a moving object is included in the right side background acquisition region 311 based on a frame difference detected in this region 311 (step S10).

Figure 12:
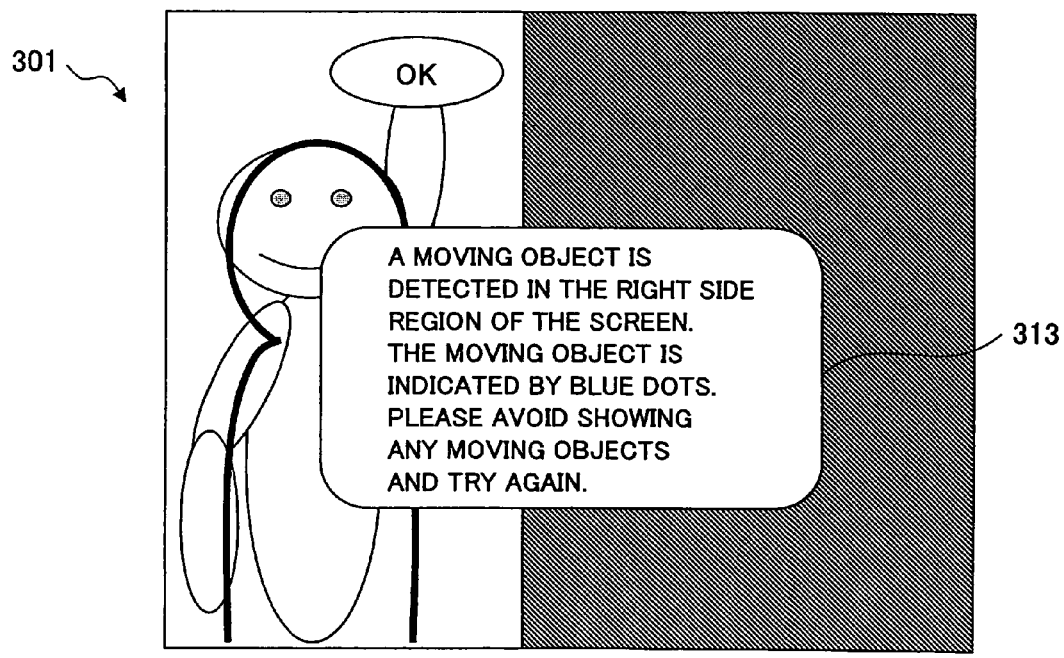
FIG. 12 is a diagram showing an exemplary screen that may be displayed when the right side background image acquisition process fails.

When it is determined in step S10 that a moving object is included in the right side background acquisition region 311, an error screen is displayed for a predetermined period of time (step S11). FIG. 12 is a diagram showing an exemplary error screen that may be displayed when the right side background image acquisition process fails. In FIG. 12, a message 313 indicating, "A MOVING OBJECT IS DETECTED IN THE RIGHT SIDE REGION OF THE SCREEN. THE MOVING OBJECT IS INDICATED BY BLUE DOTS. PLEASE AVOID SHOWING ANY MOVING OBJECTS AND TRY AGAIN." is displayed on the monitor screen 301.

Referring back to FIG. 8, when it is determined in step S10 that no moving objects are included in the right side background acquisition region 311, the image of the right side background acquisition region 311 is acquired as a background image (step S12).

Figure 13:
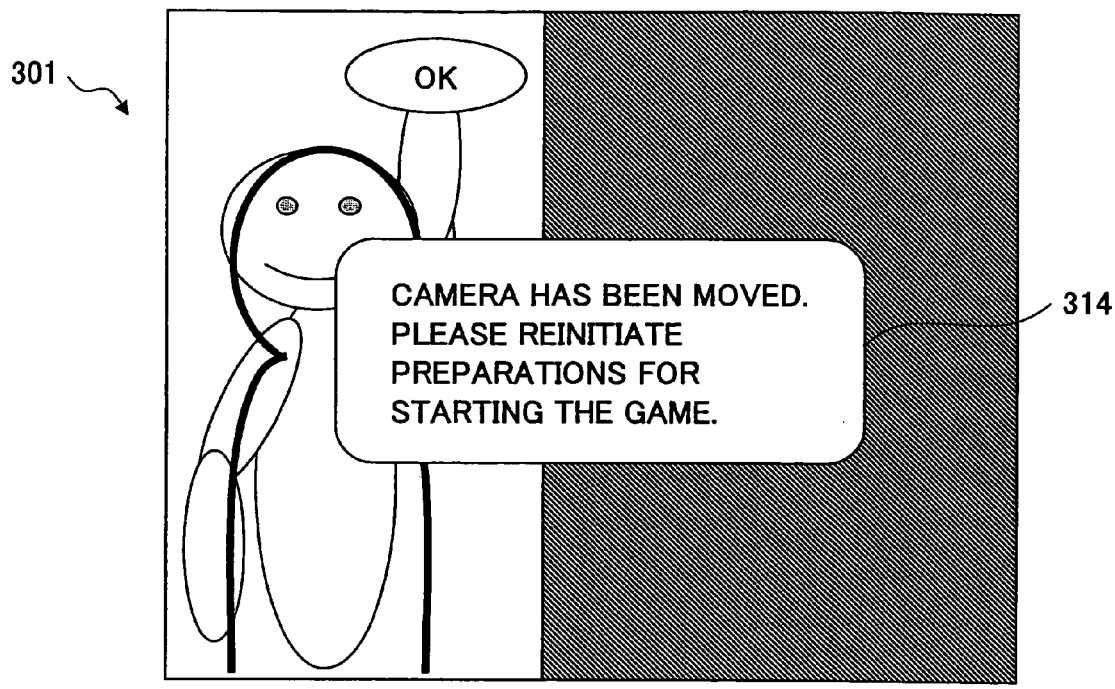
FIG. 13 is a diagram showing an exemplary screen that may be displayed when a camera is moved from the time of acquiring a left side background image to the time of acquiring a right side background image.

Then, a determination is made as to whether a color difference above a predetermine level is detected between overlapping portions of the left side background image and the right side background image (step S13). If such a color difference above the predetermined level is detected, an error screen is displayed (step S14), and the operation goes back to the step of displaying the guidance for left side background image acquisition (step S3). FIG. 13 is a diagram showing an exemplary screen that may be displayed in a case where the camera is moved from the time of acquiring the left side background image to the time of acquiring the right side background image. In FIG. 13, a message 314 indicating, "CAMERA HAS BEEN MOVED. PLEASE REINITIATE PREPARATIONS FOR STARTING THE GAME." is displayed on the monitor screen 301.

Referring back to FIG. 8, in a case where a color difference exceeding a predetermined level is not detected between the overlapping regions of the left side background image and the right side background image, the background image acquisition process is ended and the game is started (step S15).

Figure 14:
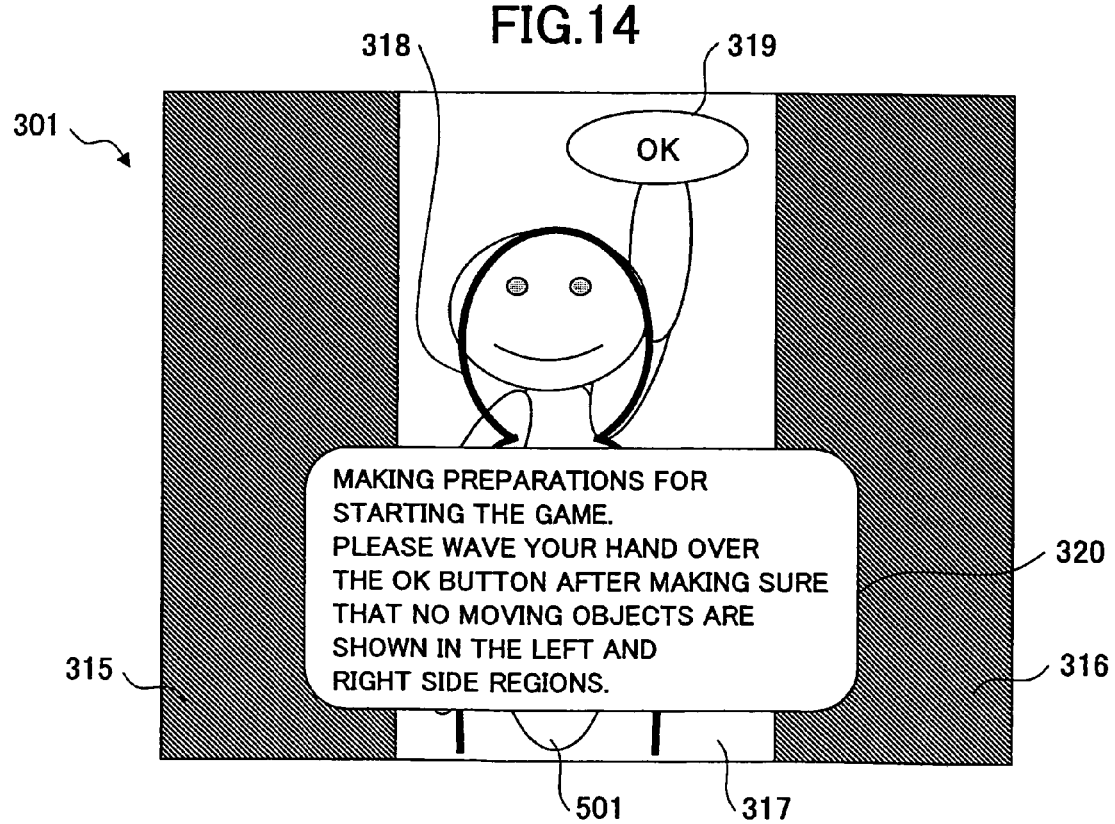
FIG. 14 is a diagram showing an exemplary screen that may be displayed when only images of left and right side edge regions are acquired in the background image acquisition process.

FIG. 14 is a diagram showing an exemplary screen that may be displayed when only images of left and right side edge regions are acquired in the background image acquisition process. In the process described with reference to FIGS. 8 through 13, a background image of the entire region that is captured by the camera is acquired; however, in some games, the background difference may only be required for certain portions of the region being captured. In this case, the background images of such portions may be acquired.

In the example shown in FIG. 14, background images of background acquisition regions 315 and 316 corresponding to left and right side edge regions with predetermined widths are arranged to be acquired. In this case, a frame 318 indicating a standing position outline for the user 501 and a button item 319 to be operated by the player 501 are displayed at a central operation region 317, and a message 320 indicating, "MAKING PREPARATIONS FOR STARTING THE GAME. PLEASE WAVE YOUR HAND OVER THE OK BUTTON AFTER MAKING SURE THAT NO MOVING OBJECTS ARE SHOWN IN THE LEFT AND RIGHT SIDE REGIONS." is displayed.

According to an aspect of the present invention, operations information corresponding to a pose is generated based on a frame difference and/or a background difference (i.e., difference in pixel information between pixels of a background image and a current image) of an image within a predetermined region of an image captured by a camera which captured image includes an image of the posture of a player. Thus, detailed operations may be realized that are similar to those realized by an analog stick of a game controller, and the image captured by the camera does not have to be displayed on the entire monitor screen.

It is noted that embodiments within the scope of the present invention include a pose detection method, a video game apparatus, a pose detection program, and computer-readable medium containing a computer program. The pose detection program may be embodied in any computer-readable medium for carrying or having computer-executable instructions or data structures stored thereon. Such a computer-readable medium can be any available medium which can be accessed by a general purpose or a special purpose computer. By way of example, and not limitation, such a computer-readable medium can comprise a physical storage medium such as a RAM, a ROM, an EEPROM, a CD-ROM, other optical disk storage devices, other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or other communications connection (either hardwired, wireless, or combinations thereof) to a computer, the computer properly views the connection as a computer-readable medium. Thus, any such connection is properly termed a computer-readable medium. Combinations of the above should also be included within the scope of the computer-readable medium. Computer-executable instructions comprise, for example, instructions and data which cause a general purpose computer, a special purpose computer, or a processing device to perform a certain function or a group of functions.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No.2004-255948 filed on Sep. 2, 2004, the entire contents of which are hereby incorporated by reference.

What is claimed is:

1. A pose detection method implemented in a video game using an input image supplied by a camera for detecting a pose of a player, the method comprising the steps of:

calculating a left side frame difference background difference a left side image corresponding to a left side region of an image captured by the camera which captured image includes a player image representing the pose of the player and a right side frame difference or background difference of a right side image corresponding to a right side region of the captured image;

calculating a left side center position of the left side frame difference or background difference and a right side center position of the right side frame difference or background difference;

calculating a positional difference between the left side center position and the right side center position with respect to up and down directions;

calculating an average position value of the left side center position and the right side center position with respect to up and down directions; and generating operations information corresponding to the pose of the player based on the calculated positional difference and calculated average position values, converting a value based on the calculated positional difference and the calculated average position value into an analog stick signal, calculating an additional region background difference of an additional region other than the left side region and the right side region within the captured image; and generating the operations information corresponding to the pose of the player based on whether the additional region background difference is substantial upon determining that the left side background difference and the right side background difference are insubstantial.

2. The pose detection method as claimed in claim 1, wherein the captured image is displayed within a portion of a monitor screen as an operations confirmation screen.

3. The pose detection method as claimed in claim 1, further comprising a step of:

displaying at least one marker indicating a position of a hand of the player that is recognized in at least one of the left side center position and the right side center position.

4. A video game apparatus having a CPU with the apparatus configured to execute a video game that uses an input image supplied by a camera, the apparatus comprising:

a left side frame difference or background calculating part for calculating a left side frame difference or background difference of an image corresponding to a left side region of an image captured by the camera which captured image includes a player image representing a pose of a player and a right side frame difference background difference calculating part for calculating a right side image corresponding to a right side region within the captured image, the apparatus further comprising:

a center position calculating part for calculating a left side center position of the left side frame difference or background difference and a right side center position of the right side frame difference or background difference;

a positional difference calculating part for calculating a positional difference between the left side center position and the right side center position with respect to up and down directions;

an average position value calculating part for calculating an average position value of the left side center position and the right side center position with respect to the and down directions;

an operations information generating part for generating operations information corresponding to the pose of the player based on the calculated positional difference and calculated average position value, an analog stick signal conversion part for converting a value based on the positional difference and the average position value into an analog stick signal, a first background difference calculating part for calculating a left side background difference of the left side region and a right side background difference of the right side region; and a second background difference calculating part for calculating an additional region background difference of an additional region other than the left side region and the right side region within the capture image;

wherein the operations information generating part is configured to generate the operations information corresponding to the pose of the player based on whether the additional region background difference is substantial upon determining that the left side background difference and the right side background difference are insubstantial.

5. A computer-readable medium defining a physical storage device for use with a computer containing a pose detection program run on the computer for detecting a pose of a player in a video game using an input image supplied by a camera, the program being executed by the computer to realize the functions of:

calculating a left side frame difference or background difference of a left side image corresponding to a left side region of an image captured by the camera which captured image includes a player image representing the pose of the player and a right side frame difference or background difference of a right side image corresponding to a right side region of the captured image;

calculating a left side center position of the left side frame difference or background difference and a right side center position of the right side frame difference or background difference;

calculating a positional difference between the left side center position and the right side center position with respect to up and down directions;

calculating an average position value of the left side center position and the right side center position with respect to the up and down directions; and generating operations information corresponding to the pose of the player based on the calculated frame positional difference and background difference calculated average position value.

6. The computer-readable medium as claimed in claim 5, wherein the program is executed by the computer to realize the functions of:

calculating a left side frame difference or background difference of a left side image corresponding to a left side region within the captured image and a right side frame difference or background difference of a right side image corresponding to a right side region within the captured image;

calculating a left side center position of the left side frame difference or background difference and a right side center position of the right side frame difference or background difference;

calculating a positional difference between the left side center position and the right side center position with respect to up and down directions;

calculating an average position value of the left side center position and the right side center position with respect to the up and down directions;

converting a value based on the calculated positional difference and the calculated average position value into an analog stick signal, and calculating a left side background difference on the left side region and a right side background difference of the right side region;

calculating an additional region background difference of an additional region other than the left side region and the right side region within the captured image; and generating the operations information corresponding to the pose of the player based on whether the additional region background difference is substantial upon determining that the left side background difference and the right side background difference are insubstantial.

7. A computer having a pose detection program for detecting a pose of a player represented on an input image supplied by a camera, with the program being executed by the computer to realize the functions of:

calculating a left side frame difference or background difference of a left side image corresponding to a left side region of an image captured by the camera which captured image includes a player image representing the pose of the player and a right side frame difference or background difference of a right side image corresponding to a right side region of the captured image;

calculating a left side center position of the left side frame difference or background difference and a right side center position of the right side frame difference or background difference;

calculating a positional difference between the left side center position and the right side center position with respect to up and down directions;

calculating an average position value of the left side center position and the right side center position with respect to the up and down directions; and generating operations information corresponding to the pose of the player based on the calculated positional difference and calculated average position value.

8. The computer as claimed in claim 7, wherein the pose detection program is further executed to realize the functions of:

calculating a left side frame difference or background difference of a left side image corresponding to a left side region within the captured image and a right side frame difference or background difference of a right side image corresponding to a right side region within the captured image;

calculating a left side center position of the left side frame difference or background difference and a right side center position of the right side frame difference or background difference;

calculating a positional difference between the left side center position and the right side center position with respect to up and down directions;

calculating an average position value of the left side center position and the right side center position with respect to the up and down directions;

converting a value based on the calculated positional difference and the calculated average position value into an analog stick signal and wherein the pose detection program is further executed to realize the functions of:

calculating a left side background difference of the left side region and a right side background difference of the right side region;

calculating an additional region background difference of an additional region other than the left side region and the right side region within the captured image; and generating the operations information corresponding to the pose of the player based on whether the additional region background difference is substantial upon determining that the left side background difference and the right side background difference are insubstantial.

* * * * *